(12) United States Patent
Anderson et al.

(10) Patent No.: US 6,820,435 B2
(45) Date of Patent: Nov. 23, 2004

(54) COOLING ENHANCEMENT DEVICE

(75) Inventors: Lynn A. Anderson, Stanton, MI (US); Robert L. Cushman, Rockford, MI (US)

(73) Assignee: Electrolux Home Products, Inc., Cleveland, OH (US)

( * ) Notice: Subject to any disclaimer, the term of this patent is extended or adjusted under 35 U.S.C. 154(b) by 0 days.

(21) Appl. No.: 10/106,016

(22) Filed: Mar. 25, 2002

(65) Prior Publication Data

US 2002/0175214 A1 Nov. 28, 2002

Related U.S. Application Data

(60) Provisional application No. 60/278,160, filed on Mar. 23, 2001.

(51) Int. Cl.[7] .............................................. G05D 23/30
(52) U.S. Cl. ...................... 62/202; 236/68 B; 337/377
(58) Field of Search ........................... 236/68 B, 68 R; 337/377; 62/202, 161, 162, 163

(56) References Cited

U.S. PATENT DOCUMENTS

| | | | |
|---|---|---|---|
| 2,246,956 A | * | 6/1941 | Shaw ........................... 62/202 |
| 2,498,864 A | * | 2/1950 | Root ............................ 62/202 |
| 3,759,053 A | | 9/1973 | Swaneck, Jr. ................. 62/151 |
| 3,834,618 A | * | 9/1974 | Buckwalter ................ 236/46 R |
| 4,002,199 A | | 1/1977 | Jacobs ........................ 62/80 X |
| 4,417,450 A | * | 11/1983 | Morgan et al. ............... 62/126 |
| 4,441,329 A | * | 4/1984 | Dawley ..................... 236/68 B |
| 4,590,773 A | | 5/1986 | Hoshino et al. .............. 62/333 |
| 4,689,966 A | | 9/1987 | Nonaka ....................... 62/187 |
| 5,265,434 A | | 11/1993 | Alsenz .................. 62/228.3 X |
| 5,487,277 A | | 1/1996 | Bessler ........................ 62/187 |
| 5,708,256 A | * | 1/1998 | Montagnino et al. ....... 219/497 |
| 5,750,961 A | * | 5/1998 | Schug et al. ................ 219/497 |
| 5,844,207 A | * | 12/1998 | Allard et al. ................ 219/497 |
| 6,006,531 A | | 12/1999 | Pritts et al. ................... 62/187 |
| 6,101,826 A | | 8/2000 | Bessler ........................ 62/187 |
| 6,153,860 A | | 11/2000 | Weng | |

* cited by examiner

*Primary Examiner*—Harry B. Tanner
(74) *Attorney, Agent, or Firm*—Pearne & Gordon LLP

(57) ABSTRACT

A cooling enhancement device causes rapid cooling of an item placed within a cooling unit. The device includes a temperature simulating arrangement (e.g., including a heat generating element adjacent a temperature sensor of the cooling unit) to simulate an artificial temperature within the cooling unit. In one example, the device includes a control system connected to control the operation of the temperature simulating arrangement. The device also includes a setting component to provide user control. In one example, the setting component is connected to communicate a rapid cooling setting input by the user to the control system.

26 Claims, 1 Drawing Sheet

COOLING ENHANCEMENT DEVICE

This application claims priority of U.S. Provisional Patent Application Ser. No. 60/278,160, filed on Mar. 23, 2001.

BACKGROUND OF THE INVENTION

1. Field of the Invention

The present invention relates generally to a device for providing rapid cooling control within a cooling appliance or unit (e.g., a refrigerator or a freezer). In particular, the present invention pertains to a device to allow the user of a cooling unit to quickly cool an item (e.g., an item such as food or water for producing ice cubes) placed within the cooling unit.

2. Description of Related Art

Cooling appliances or units (e.g., refrigerators and freezers) are common household and industrial appliances used to keep food and other perishable items sufficiently cold (e.g., colder than ambient temperature or frozen) for preservation or the like. Also, cooling units are used to produce supplies of low temperature items, such as cold water, ice cubes, and the like. However, sometimes it is desirable to quickly cool (e.g., reduce below ambient temperature or freeze) an item, or to quickly replenish a supply of a low temperature, such as ice cubes.

Typically, a cooling unit has a temperature sensor positioned to sense an interior temperature and provide a temperature-indicative signal to a temperature controller of a temperature control system. In response to a sensed temperature above a preset upper threshold limit, corresponding to a user selected setting, the temperature controller activates a cooling mechanism (e.g., a compressor and evaporator arrangement) that provides cooling within the cooling unit. Once the temperature within the cooling unit falls to a predetermined lower temperature threshold, which is related to the user selected setting, the controller deactivates the cooling mechanism. Thus, the cooling mechanism (e.g., the compressor and the evaporator) operates only for a cycle period. The cooling mechanism will not again activate, for another cycle, until the temperature sensor senses temperature above the upper threshold.

When an item to be cooled (e.g., reduced below ambient temperature or frozen) is placed in such a cooling unit, the item is exposed to an environment having a temperature that falls within the predetermined range of operating temperatures defined by the user-selected setting. This may cause the cooling mechanism to be deactivated, despite a fact that the item is not yet at a desired low temperature. A large number of cooling cycles may be required to sufficiently cool the item depending on several factors including the size, temperature, and composition of the item. This may prolong the cooling process for a long period of time and increase the likelihood of thermal damage to perishable items. Also, such a protracted period to cool may cause loss of a desirable characteristic of the item (e.g., a characteristic of flavor for a food item). Furthermore, for items that must be replenished by a cooling unit on a regular basis, such as ice cubes, the time required to freeze these items may prove unsatisfactory.

To shorten the sometimes lengthy cooling periods as mentioned above, a user can select a colder setting than required for maintaining a temperature that is sufficient for everyday use. This lowers the entire range of operating temperatures for the particular cooling unit causing the cooling mechanism to operate more frequently and for longer periods of time than it would normally operate. If a user selects a setting having a lower threshold below that which the cooling system is able to reach (e.g., due to passive losses), the cooling mechanism may operate indefinitely. Furthermore, a user may not remember to change the setting back to a normal setting, resulting in the cooling unit being undesirably cold for a protracted period and/or using too much energy, leading to increased operating costs and possibly even damaging the cooling unit and/or items therein.

Accordingly, a simple and user-friendly means of temporarily reducing the temperature of a cooling unit for the fast cooling of an item contained therein without adversely impacting the normal temperature settings is desirable.

SUMMARY OF THE INVENTION

In accordance with one aspect, the present invention provides a cooling enhancement device for causing rapid cooling of an item placed within a cooling unit. The cooling enhancement device includes temperature simulating means to simulate an artificial temperature within the cooling unit. A control system of the cooling enhancement device is connected to control the operation of the temperature simulating means. A setting component of the cooling enhancement device is connected to communicate a rapid cooling setting input by a user to the control system.

In accordance with another aspect, the present invention provides a cooling enhancement device for causing rapid item cooling within a cooling unit. A heat generating element is located to provide heat energy to a temperature sensor associated with a temperature control system of the cooling unit. A setting component is connected to cause operation of the heat generating element.

In accordance with another aspect, the present invention provides a cooling enhancement device for causing rapid item cooling within a cooling unit. A heat generating element is located to provide heat energy to a temperature sensor associated with a temperature control system of the cooling unit. A control system is connected to the heat generating element to control the operation of the heat generating element. A setting component is connected to communicate a rapid cooling setting input by a user to the control system.

In accordance with yet another aspect of the present invention, the setting component allows a user to set a desired cooling mode that corresponds to rapid cooling conditions and a period of time for maintaining those conditions. The setting component transmits this setting to the control system, which then operates the means for simulating an artificial temperature. The temperature simulating means causes a temperature sensor of the cooling unit to detect a higher temperature within the cooling unit than is actually present, thereby activating a temperature control system associated with the cooling unit. The control system controls the simulated temperature within the cooling unit by methods such as pulsing the operation of a resistance heater or controlling the voltage provided thereto, for example. When the period of time for maintaining the rapid cooling conditions has expired, the control system turns the means for simulating an artificial temperature off, and the cooling unit thereby resumes normal operation.

BRIEF DESCRIPTION OF THE DRAWINGS

The foregoing and other features and advantages of the present invention will become apparent to the person of ordinary skill in the art to which the present invention relates upon consideration of the following description with reference to the accompanying drawings, wherein.

DESCRIPTION OF EXAMPLE EMBODIMENT

Certain terminology is used herein for convenience only and is not to be taken as a limitation on the present invention. For example, the term "cooling unit" is used generally to refer to an apparatus, such as a refrigerator or freezer, that provides for the cooling of an item placed therein. As another example, the term "item" is used generally to refer to items such as food, and also water that is to be cooled for consumption or even frozen into ice cubes. As a still further example, the term "cooling" is used generally to refer to a reduction of temperature below an ambient atmosphere temperature or to freeze.

Figure 1:
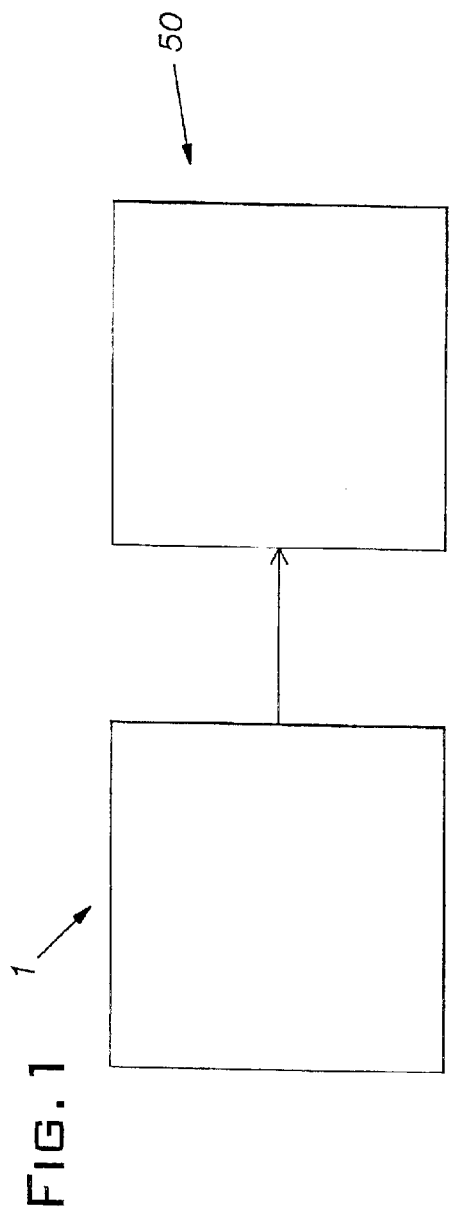
FIG. 1 is a block diagram of a device in accordance with the present invention and a cooling unit, and indicates the relationship between the device and the cooling unit.

FIG. 1 illustrates a relationship between a cooling enhancement device 1 in accordance with the present invention and a cooling unit 50. In one example, the cooling unit 50 is a conventional type cooling unit. With regard to the relationship, the cooling enhancement device 1 interacts with the cooling unit 50 such that normal or typical operation of the cooling unit is thereby altered. The alteration is to change or override the cooling cycle of the cooling unit 50 such that the cooling unit continues to provide cooling output.

Figure 2:
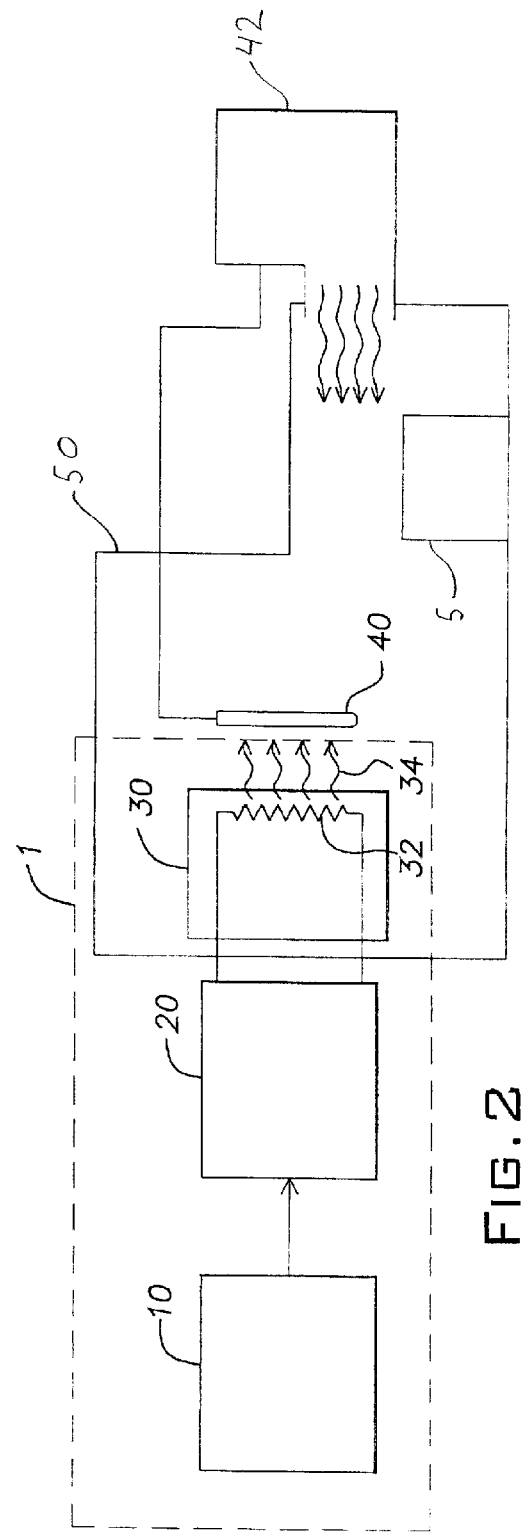
FIG. 2 is a block diagram showing specifics of one embodiment of the present invention and the cooling unit.

Turning to FIG. 2, the cooling unit 50 has an interior, within which a cool temperature (e.g., below ambient atmosphere temperature or below water freezing temperature) is provided for an item 5. The cooling unit 50 includes a temperature sensor 40 and a temperature control system 42. The temperature sensor 40 senses temperature within the interior of the cooling unit 50, and is operatively connected to the temperature control system 42 to provide a signal indicative of sensed temperature to the control system. The temperature sensor 40 may have any suitable construction and configuration to provide the function of sensing temperature and providing the temperature indicative signal.

The temperature control system 42 controls the temperature within the interior of the cooling unit 50. Specifically, the temperature control system 42 utilizes the temperature indicative signal from the temperature sensor 40 to determine the need for cooling, and in response to a determined need for cooling provides a cooling effect within the interior of the cooling unit 50. In one example, the temperature control system 42 includes circuitry that utilizes the temperature indicative signal to generate a control signal. Further in the one example, the temperature control system 42 includes a compressor and evaporator arrangement that is activated by the control signal to provide the cooling effect. Many examples of structures, configurations, etc. of such temperature control systems are known and are thus not described further herein. Further, specific structures, configurations, etc. of such temperature control systems are not a limitation of the scope of the present invention.

The cooling enhancement device 1, described herein below, is a device that can be added to the cooling unit 50 as an accessory, or manufactured as part of the cooling unit. As such, the cooling enhancement device 1 can be a separate entity that is distinct from the cooling unit 50, or it can be integrated as part of the cooling unit 50 itself. However, despite the relationship (either added or integrated) between the cooling enhancement device 1 and the cooling unit 50, the cooling enhancement device 1 can be powered by electrical power received from a power bus of the cooling unit.

Focusing again upon FIG. 2, the cooling enhancement device 1 includes a user operable setting component 10. The user interacts with the setting component 10, allowing the user to set the cooling unit 50 to various rapid-cooling modes. In one example, setting component 10 is interactive with the user. In other words, the setting component provides some level of indication to the user concerning the selected setting. The interaction/indication may be simple (e.g., print indicia such as numeric values for operation) or more complex.

In at least one embodiment of the present invention, the setting component 10 contains plural settings choices, each of which relates to the particular item 5 to be rapidly cooled or a particular cooling process. For example, if the item 5 is water to be frozen, one setting might be to rapidly produce ice cubes. Another setting might be to flash-freeze fresh vegetables as the item 5. A third setting might be for rapid freezing of meat as the item 5. Still another setting might be for the quick cooling of a large quantity of items 5 (the single item in FIG. 2 is representative of plural items), such as when the cooling unit 50 (e.g., a refrigerator or freezer) is first filled with items that are at a temperature greater than that present within the cooling unit.

In one example, each setting contains a set of instructions that define the conditions necessary to rapidly cool the item 5. Such instructions are communicated to the control system 20. In the event that a setting does not exist for a particular item 5, the setting component 10 provides the user with the option of directly defining the rapid cooling conditions within the cooling unit 50 for custom settings and special purposes.

It is to be noted that cooling units, such as cooling unit 50, are also designed for several uses other than cooling food items. For example, cooling units are commonly used in medical applications to preserve organisms that cannot live outside of another living organism for an extended period of time, and to slow the effects of decomposition on human remains for postmortem medical examination. Another embodiment of the cooling enhancement device 1 is configured with the setting component 10 having settings that correspond to the needs of these non-food cooling unit applications. Again, the setting component 10 can be configured to allow the user the option of directly defining rapid cooling conditions within the cooling unit 50 for custom settings and special purposes.

Returning again to FIG. 2, the setting component 10 in operatively connected to a control system 20 for communication of the user selected setting to the control system. In one example, the control system 20 functions to cause operation of the cooling enhancement device 1 such that an artificial temperature (i.e., artificially high temperature) is simulated for the cooling unit 50 according to the user selected setting. Within the example shown in FIG. 2, a means 30 for simulating the artificial temperature is generically represented by the box 30, and can have various structures and configurations. The means 30 for simulating the artificial temperature can thus be generically considered to be an arrangement for such purposes. The artificial temperature is utilized to cause operation of the temperature control system 42 when the temperature control system might not otherwise be operating. Thus, in one sense the cooling enhancement device 1 "tricks" the temperature control system 42 to operate.

In one example, the construction and configuration of the control system 20 are based on simple electronic logic, and utilize a microprocessor or other multipurpose controller, custom designed controllers, or any other controller of the like. It is to be appreciated that the control system 20 may be even implemented within the existing temperature control system 42 through a hardware modification and/or via a software/firmware upgrade.

Based on the setting received from the setting component 10, the control system 20 operates the means 30 for simulating the artificial temperature for a limited amount of time. In one example, the amount of time is for a specific time period. The length of this operational period of time depends on the user selected setting. It is to be appreciated that a time period need not be calculated by the user, but can be preset based on a preprogramed estimate of time that the desired mode requires. For example, producing ice cubes is likely to require a different period of operation than freezing meat or vegetables. Large quantities of food will require a longer period of operation compared to small quantities of food, etc.

According to the embodiment illustrated in FIG. 2, the means 30 for simulating the artificial temperature includes a heating element 32 such as a resistive heater, light element, or radiant heater, for example, but other types of heat producing elements not listed herein are within the scope of this embodiment. As such, within this particular example, the simulation of an artificial temperature includes the introduction of heat, albeit a small amount, into the cooling unit 50. The heating element 32 is positioned to provide heat energy 34 to the temperature sensor 40 associated with the cooling unit 50. Thus, the heating element 32 of the cooling enhancement device 1 cause the temperature sensor 40 to sense a temperature that is actually different (i.e., greater than) from the true overall temperature within the cooling unit 50. Thus, there is a simulation of a higher temperature within the cooling unit 50 for the temperature control system 42 to perceive via the associated temperature sensor 40.

The heating element 32 may be located near, in contact with, or even wrapped around the temperature control system temperature sensor 40. In the case of a radiant heater, the heating element may be located anywhere in proximity to the temperature sensor 40 so long as there are no objects obstructing the path along which the heat energy 34 must radiate, and the heat energy 34 reaches the temperature sensor 40. Despite the type and location of the heating element 32 included in this embodiment, it will provide a known or predictable rate of heat energy 34 to the temperature sensor 40 when provided with electrical energy, such that the control system 20 can implement the desired user-selected setting. As mentioned above, the electrical power required to operate the means for simulating an artificial temperature is delivered via the power bus (not shown) of the cooling unit 50. The control system 20 can thus control the actual temperature within the cooling unit 50 according to the user selected setting.

In one example, the actuation of the heating element 32 for simulating an artificial temperature is via a pulsing current operation. The output from the heating element 32 would vary, but still in order to simulate an artificial temperature above the actual temperature that exists within the cooling unit 50. This "artificial" temperature is sensed by the temperature sensor 40 causing the cooling unit's temperature control system 42 to "believe" that the temperature within the cooling unit 50 is higher in actuality.

Alternatively, the control system might vary the voltage provided to the heating element 32, again varying the heat output by the heating element. A further alternative can use a combination of pulsing the operation of the heater element 32 and varying the voltage provided to it. In this way, the cooling enhancement device 1 can more finely control the rapid cooling process and the temperature within the cooling unit 50 to better adapt the process to the particular user settings or modes of operation. The more control over the pulse width and/or voltage the control system 20 has, the finer the temperature setting can be simulated, and the more additional modes that can be provided to the user. Still further, it is to be appreciated that other ways and approaches (e.g., electronic control, temperature sensor signal override, etc.) to simulating an artificial temperature and "trick" the unit's temperature control system 42 are possible.

According to one method of use, a user selects a preset, if available, at the setting component 10 that corresponds to the particular item 5 to be cooled, or directly defines the rapid cooling conditions for a custom setting or special purpose. Once entered, the user selected setting is communicated by the setting component 10 to the control system 20. The control system 20 operates the means 30 for simulating an artificial temperature within the cooling unit 50 to simulate a temperature within the cooling unit 50 that corresponds to the user selected setting that was input into the setting component 10. The temperature sensor 40, sensing the simulated artificial temperature, activates the temperature control system 42 in an effort to lower the simulated artificial temperature to a temperature that falls within the normal range of temperatures commonly found in such a cooling unit 50. The extended operation of the temperature control system 42 caused by the simulated artificial temperature sensed by the temperature sensor 40 cools the item 5 within the cooling unit 50 at a rate much quicker than under normal cooling conditions found within the cooling unit 50. When the period of operating the temperature control system 42 as defined by the user selected setting has expired, the means 30 for simulating an artificial temperature is deactivated and the temperature sensor 40 again senses the actual temperature that exists within the cooling unit 50.

The temperature may be below the lower limit of temperatures for which the temperature control system 42 normally operates. As such, the temperature control system 42 is deactivated at this time. A normal operation (e.g., monitoring of true temperature and cycling the cooling mechanism as needed) of the temperature control system 42 resumes.

Thus, the present invention provides a useful means to provide rapid and quick cooling capability to various cooling units, such as cooling unit 50.

While the present invention has been described with reference to a few specific embodiments, the description is illustrative of the invention and is not to be construed as limiting the invention. Various modifications and improvements may occur to those skilled in the art without departing from the true spirit and scope of the invention as defined by the appended claims. Such modifications and improvements within the skill of the art are intended to be covered by the claims.

What is claimed is:

1. A cooling enhancement device for use in conjunction with a primary temperature control system of a cooling unit to cause the rapid cooling of an item placed within the cooling unit, the cooling enhancement device comprising:

temperature simulating means that simulates an artificial temperature within the cooling unit overriding the primary temperature control system of the cooling system to induce a lower temperature to allow for rapid cooling of the item;

a rapid cooling control system operatively connected to control the operation of the temperature simulating means; and a rapid cooling setting component operatively connected to communicate a rapid cooling setting input by a user to the rapid cooling control system, wherein the temperature simulating means includes a heat generating element positioned near a temperature sensor associated with the primary temperature control system of the cooling unit.

2. The cooling enhancement device according to claim 1, wherein an amount of heat provided by the heat generating element is controlled by pulsing the operation of the heat generating element.

3. The cooling enhancement device according to claim 1, wherein the amount of heat provided by the heat generating element is controlled by varying the amount of electrical power supplied to the heat generating element.

4. The cooling enhancement device according to claim 1, wherein the amount of heat provided by the heat generating element is controlled by pulsing the operation of the heat generating element and varying the amount of electrical power supplied to the heat generating element.

5. The cooling enhancement device according to claim 1, wherein the heat generating element is positioned in direct contact with the temperature sensor associated with the primary temperature control system of the cooling unit to measure the temperature within the cooling unit.

6. The cooling enhancement device according to claim 5, wherein the amount of heat provided by the heat generating element is controlled by pulsing the operation of the heat generating element.

7. The cooling enhancement device according to claim 5, wherein the amount of heat provided by the heat generating element is controlled by varying the amount of electrical power supplied to the heat generating element.

8. The cooling enhancement device according to claim 5, wherein the amount of heat provided by the heat generating element is controlled by pulsing the operation of the heat generating element and varying the amount of electrical power supplied to the heat generating element.

9. The cooling enhancement device according to claim 1, wherein the rapid cooling setting component includes a plurality of preprogramed settings, each of which pertains to a set of rapid cooling conditions required to rapidly cool particular items.

10. The cooling enhancement device according to claim 1, wherein the rapid cooling setting component includes a custom setting option that allows a user to specify a rapid cooling condition for which a preprogramed setting does not exist.

11. The cooling enhancement device according to claim 1, wherein the rapid cooling setting input by the user via the setting component corresponds to a period of time during which the artificial temperature must be simulated to cool the item to a desired temperature, the rapid cooling control system operates the means for simulating for the period of time.

12. The cooling enhancement device according to claim 1, wherein the cooling enhancement device is operatively interconnected with portions of the cooling unit.

13. The cooling enhancement device according to claim 12, wherein the cooling enhancement device is connected to receive power from the cooling unit.

14. A cooling enhancement device for use in conjunction with a primary temperature control system of a cooling unit to cause rapid item cooling within the cooling unit, the cooling enhancement device comprising:

a heat generating element located to provide heat energy to a temperature sensor associated with the primary temperature control system of the cooling unit; and a setting component connected to cause operation of the heat generating element.

15. The cooling enhancement device according to claim 14, wherein the cooling enhancement device is operatively interconnected with portions of the cooling unit.

16. A cooling enhancement device for use in conjunction with a primary temperature control system of a cooling unit to cause rapid item cooling within the cooling unit, the cooling enhancement device comprising:

a heat generating element located to provide heat energy to a temperature sensor associated with the primary temperature control system of the cooling unit;

a control system connected to the heat generating element to control the operation of the heat generating element; and a setting component connected to communicate a rapid cooling setting input by a user to the control system.

17. The cooling enhancement device according to claim 16, wherein the setting component has a plurality of preprogramed settings, each of which pertains to a rapid cooling condition for rapidly cooling a particular item, and the setting component includes a custom setting option that allows a user to specify a rapid cooling condition for which a preprogramed setting does not exist.

18. The cooling enhancement device according to claim 16, wherein the amount of heat provided by the heat generating element is controlled by pulsing the operation of the heat generating element.

19. The cooling enhancement device according to claim 16, wherein the amount of heat provided by the heat generating element is controlled by varying the amount of electrical power supplied to the heat generating element.

20. The cooling enhancement device according to claim 16, wherein the amount of heat provided by the heat generating element is controlled by pulsing the operation of the heat generating element and varying the amount of electrical power supplied to the heat generating element.

21. A cooling enhancement device for causing rapid cooling of an item placed within a cooling unit, the cooing enhancement device comprising:

temperature simulating means to simulate and artificial temperature within the cooling unit;

a control system operatively connected to control the operation of the temperature simulating means; and a rapid cooling setting component operatively connected to communicate a rapid cooling setting input by a user to the rapid cooling control system, wherein the temperature simulating means includes a heat generating element positioned near a temperature sensor associated with the temperature control system of the cooling unit, and wherein the rapid cooling setting component included a plurality of preprogramed settings, each of which pertains to a set of rapid cooling conditions required to rapidly cool particular items.

22. A cooling enhancement device for causing rapid cooling of an item placed within a cooling unit, the cooing enhancement device comprising:

temperature simulating means to simulate and artificial temperature within the cooling unit;

a control system operatively connected to control the operation of the temperature simulating means; and a rapid cooling setting component operatively connected to communicate a rapid cooling setting input by a user to the rapid cooling control system, wherein the temperature simulating means includes a heat generating element positioned near a temperature sensor associated with the temperature control system of the cooling unit, and the setting component includes a custom setting option that allows a user to specify a rapid cooling condition for which a preprogramed setting does not exist.

23. A cooling enhancement device for causing rapid cooling of an item placed within a cooling unit, the cooing enhancement device comprising:

temperature simulating means to simulate and artificial temperature within the cooling unit;

a control system operatively connected to control the operation of the temperature simulating means; and a rapid cooling setting component operatively connected to communicate a rapid cooling setting input by a user to the rapid cooling control system, wherein the temperature simulating means includes a heat generating element positioned near a temperature sensor associated with the temperature control system of the cooling unit, and the rapid cooling setting input by the user via the setting component corresponds to a period of time during which the artificial temperature must be simulated to cool the item to a desired temperature, the control system operates the means for simulating for the period of time.

24. A cooling enhancement device for causing rapid cooling of an item placed within a cooling unit, the cooing enhancement device comprising:

temperature simulating means to simulate and artificial temperature within the cooling unit;

a control system operatively connected to control the operation of the temperature simulating means; and a rapid cooling setting component operatively connected to communicate a rapid cooling setting input by a user to the rapid cooling control system, wherein the temperature simulating means includes a heat generating element positioned near a temperature sensor associated with the temperature control system of the cooling unit, and the cooling enhancement device is operatively interconnected with portions of the cooling unit.

25. A cooling enhancement device for causing rapid cooling of an item placed within a cooling unit, the cooing enhancement device comprising:

temperature simulating means to simulate and artificial temperature within the cooling unit;

a control system operatively connected to control the operation of the temperature simulating means; and a rapid cooling setting component operatively connected to communicate a rapid cooling setting input by a user to the rapid cooling control system, wherein the temperature simulating means includes a heat generating element positioned near a temperature sensor associated with the temperature control system of the cooling unit, and the cooing enhancement device is connected to receive power from the cooling unit.

26. A cooling enhancement device for causing the rapid item cooling within a cooling unit, the cooling enhancement device comprising:

a heat generating element located to provide heat energy to a temperature sensor associated with a temperature control system of the cooling unit;

a control system connected to the heat generating element to control the operation of the heat generating element; and a setting component connected to communicate a rapid cooling setting input by a user to the control system;

wherein the setting component has a plurality of preprogramed settings, each of which pertains to a rapid cooling condition for rapidly cooling a particular item, and the setting component includes a custom setting option that allows a user to specify a rapid cooling condition for which a preprogrammed setting does not exist.

* * * * *

UNITED STATES PATENT AND TRADEMARK OFFICE
CERTIFICATE OF CORRECTION

PATENT NO. : 6,820,435 B2
DATED : November 23, 2004
INVENTOR(S) : Anderson et al.

It is certified that error appears in the above-identified patent and that said Letters Patent is hereby corrected as shown below:

Column 8,
Line 47, please delete "cooing" and insert therefor -- cooling --.

Column 9,
Lines 17 and 36, please delete "cooing" and insert therefor -- cooling --.

Column 10,
Lines 9 and 22, please delete "cooing" and insert therefor -- cooling --.

Signed and Sealed this

Seventeenth Day of May, 2005

JON W. DUDAS
*Director of the United States Patent and Trademark Office*